Jan. 19, 1932. J. ACHARD 1,842,229
MACHINE FOR SHEARING METAL AND OTHER SHEETS
Filed Oct. 7, 1926 7 Sheets-Sheet 1
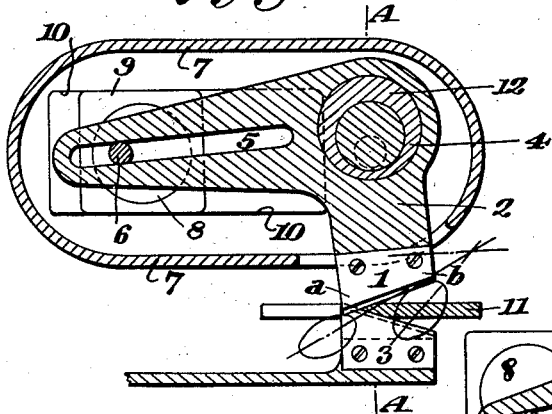
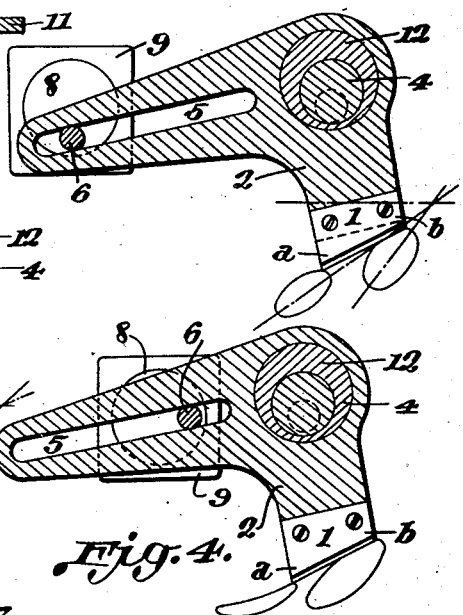
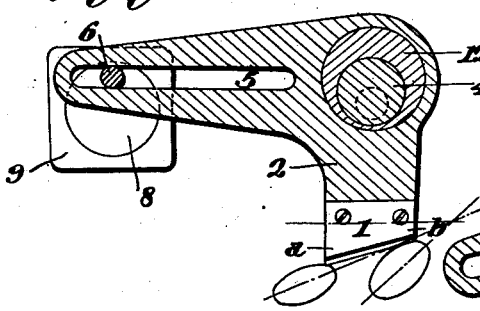
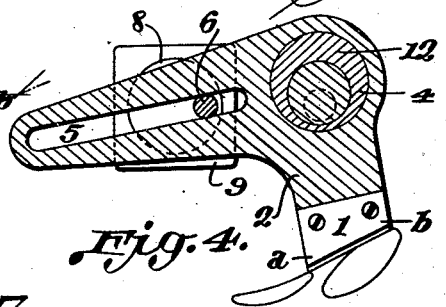
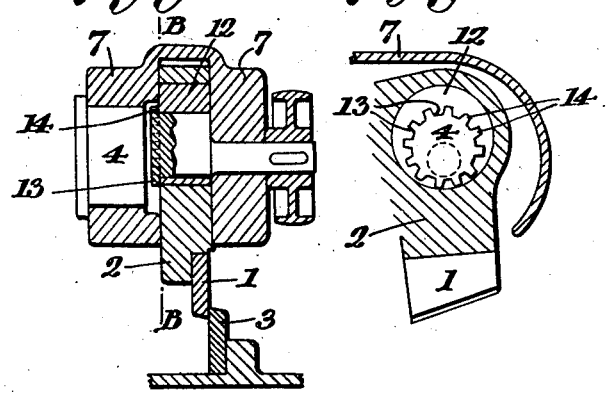
Inventor:
Jean Achard
by
Robert W Byerly
his Atty.

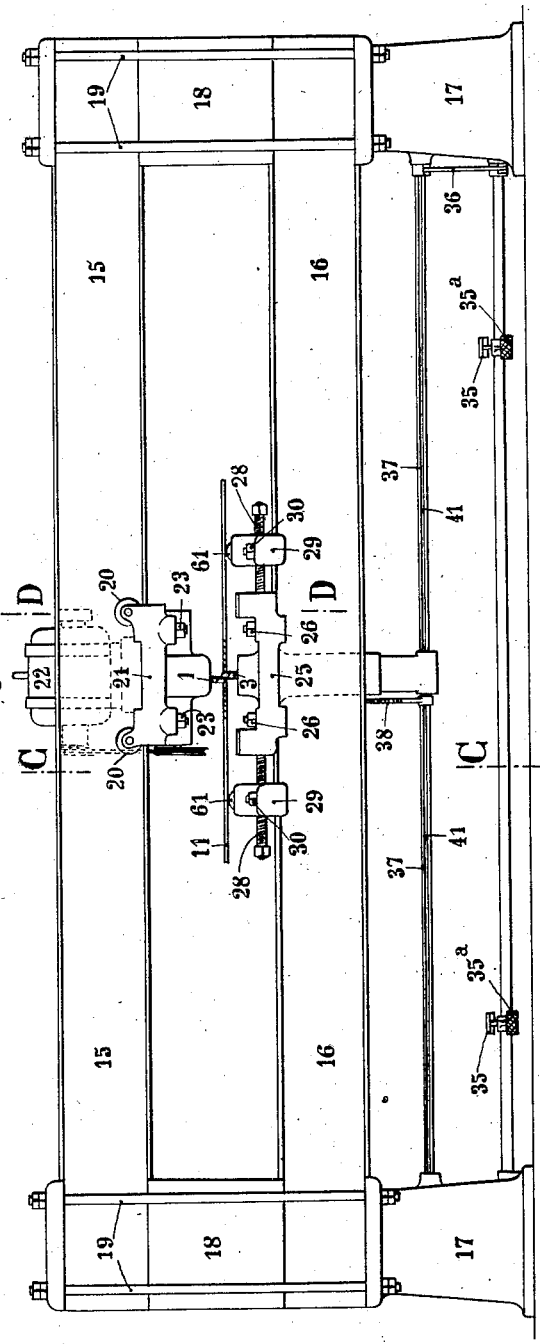

Jan. 19, 1932.  J. ACHARD  1,842,229
MACHINE FOR SHEARING METAL AND OTHER SHEETS
Filed Oct. 7, 1926  7 Sheets-Sheet 3

Inventor:
Jean ACHARD
by
Louka, Kehlenbeck & Farley
Attorneys.

Jan. 19, 1932.  J. ACHARD  1,842,229
MACHINE FOR SHEARING METAL AND OTHER SHEETS
Filed Oct. 7, 1926   7 Sheets-Sheet 4
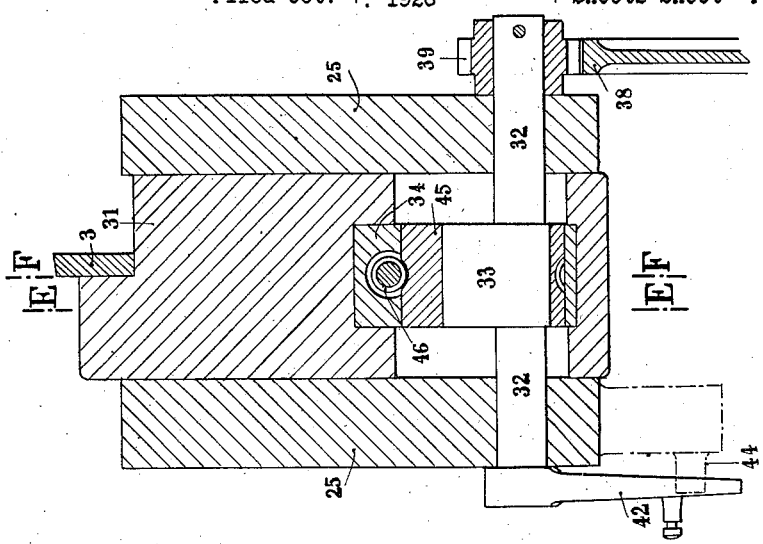
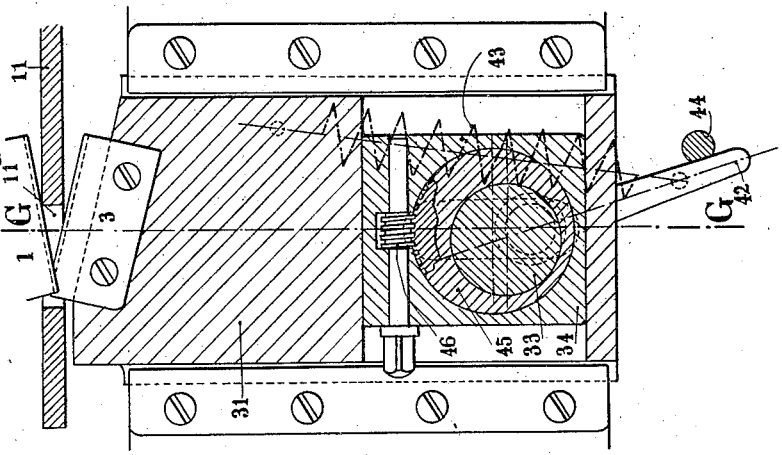
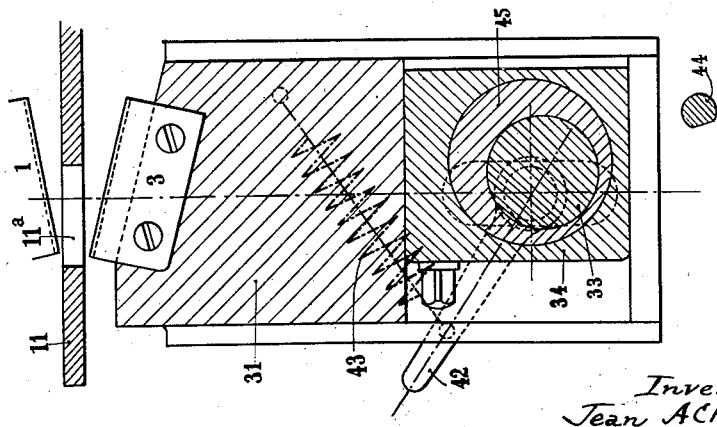
Inventor:
Jean ACHARD
by
Locke, Kellenbeck & Farley
Attorneys.

Jan. 19, 1932. J. ACHARD 1,842,229
MACHINE FOR SHEARING METAL AND OTHER SHEETS
Filed Oct. 7, 1926 7 Sheets-Sheet 5

Inventor:
Jean ACHARD
by
Lotka, Kehlenbeck & Farley
Attorneys.

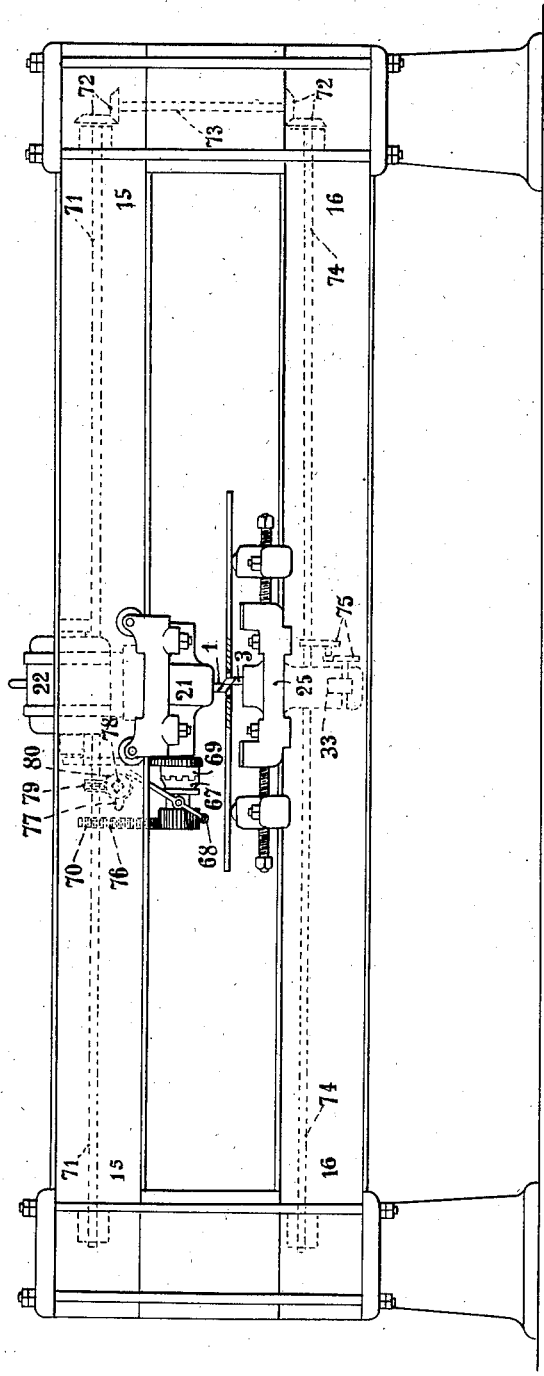

Jan. 19, 1932. J. ACHARD 1,842,229
MACHINE FOR SHEARING METAL AND OTHER SHEETS
Filed Oct. 7, 1926 7 Sheets-Sheet 7
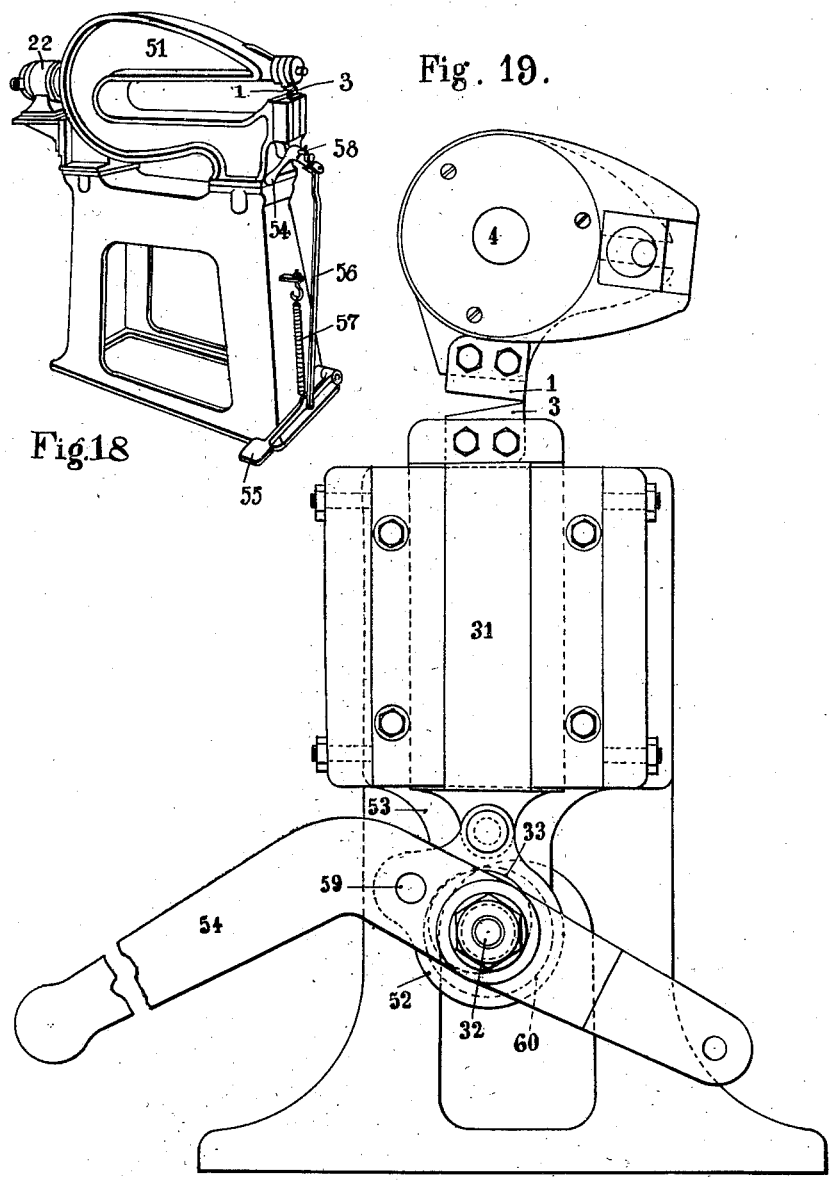

Patented Jan. 19, 1932

1,842,229

UNITED STATES PATENT OFFICE

JEAN ACHARD, OF PARIS, FRANCE, ASSIGNOR TO SOCIETE ANONYME DES ANCIENS ETABLISSEMENTS ACHARD & CIE., OF PARIS, FRANCE

MACHINE FOR SHEARING METAL AND OTHER SHEETS

Application filed October 7, 1926, Serial No. 140,007, and in France January 28, 1926.

This invention relates to a universal shearing machine for cutting metals and other bodies rolled into sheets, which comprises an adjustable or movable blade having relatively to a fixed counter blade, a practically elliptical movement, and is chiefly characterized by the fact that it is provided with a device designed in such a manner that the movement of the adjustable blade can be regulated at will, for the purpose of adapting this movement to the work to be performed and to the nature of the body to be cut.

The universal shearing machine with blades according to the invention is further characterized by the counter blade being mounted so that it is locked during the cutting and so that it can be moved away from the movable blade for the purpose of introducing and ensuring free passage between the said blades, of plates or other materials in the form of sheets, of exposing the latter to the action of the said blades at any desired point of their surface and of slotting or cutting them even without a previous punching or perforation, the device producing the movement of the counter blade nearer to, or away from, the adjustable blade, being combined with a device for taking up the wear of the said counter blade.

The invention also relates to two constructions of the shearing machine with blades hereinbefore specified.

In one of the said constructions, the shearing machine is intended for cutting sheets of very large dimensions, and the adjustable blade as well as the counter blade, are supported by two carriages which are mounted on guides of great length on which the said carriages can be moved parallel to each other and locked in any desired position so as to enable the blades to be brought to the point where the sheets are to be cut, these two carriages carrying:—one, the driving mechanism and the device for regulating the movement of the movable blade, and the other the devices for moving the counter blade away from and nearer to the adjusting blade, and for taking up the wear of the said counter blade.

In a simplified construction, the adjustable blade with its regulating device is mounted in one of the heads of a swan neck frame, and the counter blade with its disappearance device enabling the cutting to be effected at any desired point of the surface of the sheets, is supported by the second head of the said swan neck frame.

To give a concrete example, the invention will be described with reference to the accompanying drawings in which:—

Figures 1 to 4 are vertical longitudinal sections showing diagrammatically the principle of regulation of the movement of the adjustable blade.

Figure 5 shows in cross section the eccentric shaft driving the movable blade.

Figure 6 is a vertical section on line A—A of Fig. 1.

Figure 7 is a partial section on line B—B of Fig. 6.

Figure 8 is a front elevation of one construction of the shearing machine.

Figures 11 and 12 show the device for moving away the counter blade in vertical longitudinal sections respectively on lines E—E and F—F of Fig. 13.

Figure 13 is a cross section on line G—G of Fig. 12.

Figures 16 and 17 show modified constructions of the control for moving away the counter blade.

Figures 18 and 19 show a modified construction of the shearing machine respectively in perspective and in front elevation.

Figure 9:
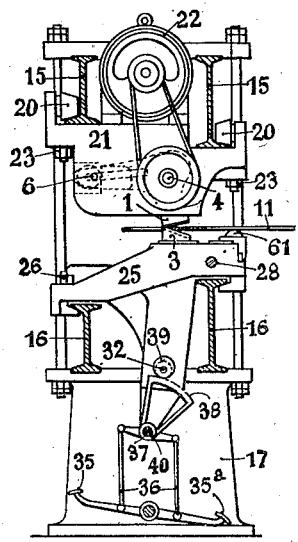
Figure 9 is a vertical cross section on line C—C of Fig. 8.
Figure 10:
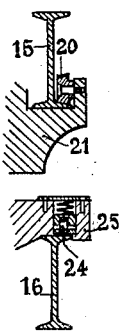
Figure 10 is a partial vertical cross section on line D—D of Fig. 8.

As shown in Figures 1 to 7, the shearing machine according to the invention chiefly comprises:

A blade 1 secured to an adjustable blade holder 2, and a counter blade 3. The blade holder 2 is mounted on an eccentric 4 of a rotary shaft and contains a slot 5 with which engages a pin 6 which constitutes a fixed point and can be given various positions relatively to the frame 7 in which the driving shaft carrying the eccentric 4 is suitably supported and given its movement of rotation by any suitable means. In the construction illustrated, the said pin 6 is secured to discs 8, the position of which can be adjusted in slide blocks 9 which can be moved and locked in any desired position in guides 10 of the frame 7.

It will be understood that, owing to this arrangement, the pin 6 can be moved in two directions at right angles, and locked in any desired position by any desired means.

It will also be understood that the fixed pin 6 constitutes an instantaneous centre of rotation on which the blade holder 2 can slide freely owing to the slot 5, and the adjustable blade 1 executes during the movement of rotation of the spindle with eccentric, a closed flat curved movement, perfectly defined for each position of the fixed pin and variable from one point to the other of the said adjustable blade.

Moreover, as shown in Figures 1 to 4, it is possible, by moving the fixed pin 6 relatively to the frame, to modify at will the elements of the curve in question, both as regards the orientation and the flattening.

Thus, the elliptical curve which is almost like a circumference of a circle in Figure 1, is more flattened in Figure 4; in the same way the major diameter of this curve rises for each point of the adjustable blade 1, the nearer the fixed pin 6 is to the sheet 11 which is being cut (Figures 2 and 3).

The shearing machine according to the invention is provided moreover with a device by means of which the amplitude of movement of the blade holder 2, and consequently of the adjustable blade 1, can be modified at will.

This device comprises chiefly an eccentric ring 12 which is mounted with a slight amount of friction on the eccentric portion 4 of the shaft driving the blade holder 2, and can be oriented and locked in different positions on the said shaft.

The eccentricities of these elements 4 and 12 being equal owing to the construction, and these two elements being arranged so that they can be locked on each other in any desired relative position, it will be understood that the device constitutes a system of eccentricity variable at will from zero (Figure 5) to the sum of the eccentricities (Figures 1 to 4).

It will also be understood that the regulation of the position of the pin 6 and the variation of the eccentricity of the driving spindle 4 provide the possibility of modifying the movement of the adjustable blade 1 and of adapting thus the movement of the latter blade to the conditions of the work to the nature of the body to be cut, to its thickness, to its strength, etc.

The locking in any desired position of the spindle 4 and of the eccentric ring or collar 12 mounted on it, can be effected in various ways, for instance, as shown in Figures 6 and 7, by means of teeth or claws 13 and 14 provided in any desired number respectively on the spindle 4 and on the ring 12 and engaging each other as may be seen in Figure 7.

In Figures 8 to 14 is shown a construction of shearing machine which comprises the device for regulating the movement of the adjustable blade, and is designed so as to enable sheets of large dimensions to be cut at any suitable point of their surface.

This shearing machine comprises a perfectly rigid fixed frame constituted by longitudinal girders 15—15 and 16—16 mounted on pedestals 17 braced at 18 and held together by ties 19. Along the upper girders 15—15 can travel, by means of rollers 20, a carriage 21 which carries the adjustable blade 1 and also an electric motor 22 driving through a suitable gear the variable eccentricity spindle 4 operating the adjustable blade mounted, as already stated, on the blade holder 2 guided by the pin 6 of adjustable position. This carriage 21 can be locked at any suitable point of the length of the girders 15—15 for instance by means of bolts 23. Along the lower girders 16—16 can slide, by means of rollers 24, a second carriage 25 carrying the counter blade 3 and capable of being locked at any desired point of the length of the said girders 16—16 by means for instance of other bolts 26.

The carriage 21 having been placed and locked on the girders 15 at the point where the sheet 11 is to be cut, the second carriage 25 is brought close to the first one by moving it along the girders 16.

The final adjustment of the position of the said carriage, so as to leave between the blades 1 and 3 the necessary play, is obtained by means of two regulating screws 28 screwed into two brackets 29, which are adjustable along the girders 16 and locked on the latter by bolts 30, and which engage either side the carriage 25. After this adjustment, the carriage 25 is locked by means of the bolts 26.

To enable sheets to be slotted, and to enable punched plates 11 as shown at 11ª, Figures 11 and 12, or plates not punched, to be put in place, the counter blade 3 in this construction of shearing machine is secured to a blade holder which is constituted by a carriage 31 mounted so as to be vertically adjustable in the carriage 25 in order to lower or raise the counter blade 3 as shown respectively in Figs. 11 and 12.

To that end, a shaft 32 rotatably mounted in the carriage 25, has an eccentric bearing surface 33 which is mounted in the interior of a slide block 34 suitably guided in the carriage 31, and is intended to produce, by an angular rotation of suitable direction given to the shaft 32, the raising or the lowering of the carriage 31 and therefore of the counter blade 3.

These angular movements of the shaft 32 are controlled, in the construction shown in Figures 8 and 9, by double pedals 35, 35ª which operate through a lever gear such as 36, a longitudinal shaft 37 on which is mounted a toothed quadrant 38 meshing with a pinion 39 secured to the shaft 32.

The toothed quadrant 38 is secured to the shaft 37 by a key 40 engaging with a groove 41 of the shaft 37, so as to enable the quadrant 38 to follow the carriage 25 in its longitudinal movements on the girders 16.

When the counter blade 3 is brought to its upper position corresponding to the working position shown in Figure 12, the eccentric 33 producing the movements of this counter blade, has slightly passed its upper dead centre and is held in this position by a lever 42 keyed to the shaft 32 and brought by a spring 43 back against a stop 44 of the carriage 25.

Owing to this arrangement, the reaction due to the shearing effort results in pressing this lever 42 against the stop 44, so that in the working position the non-reversibility of the counter blade is absolutely ensured.

During the disappearance of the counter blade 3 in the downward direction, the lever 42 is returned to the position shown in Fig. 11 in which it is held raised by the spring 43 which thus ensures safety of working.

This lever 42 which locks the eccentric 33 in the raised position of the counter blade, could be of course utilized for controlling by hand the movements of the said counter blade.

Figure 16:
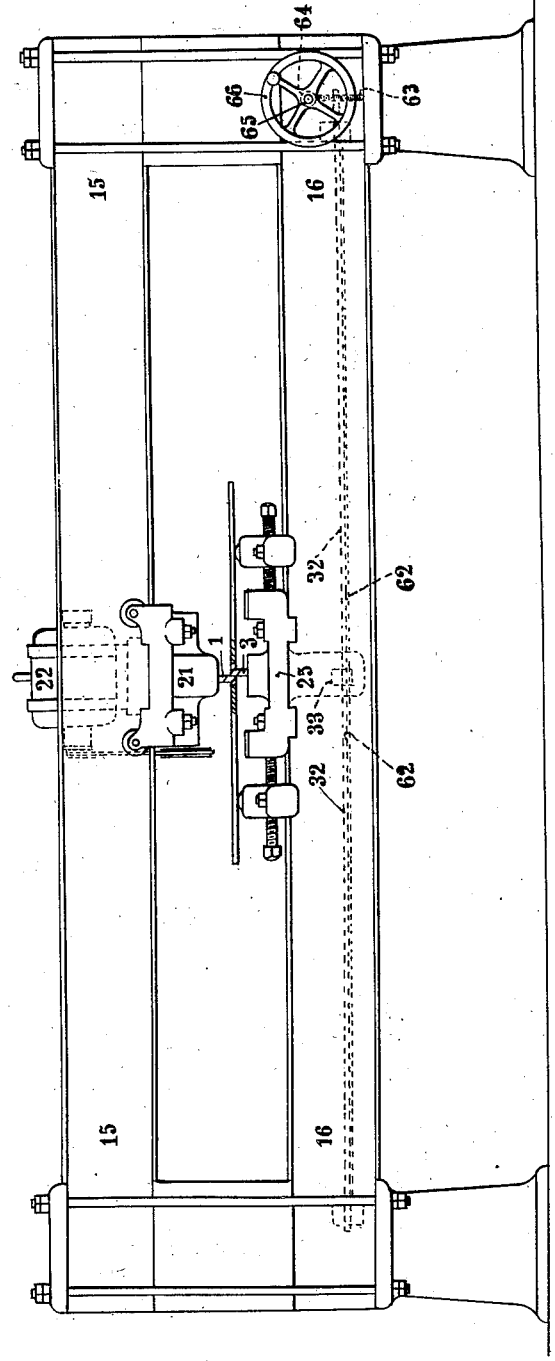

The shaft 32 carrying the eccentric 33 producing the raising and the lowering of the counter blade, could also be extended and mounted in two fixed brackets of the shearing machine frame as shown in Figure 16.

At one of its ends, this shaft 32 which has a longitudinal groove 62 along which slides the eccentric 33 during the movements of the carriage 25, is provided with a worm wheel 63 which meshes with a worm 64 keyed to a spindle 65 passing transversely through the frame and provided at each of its ends with a hand wheel 66 enabling the attendant standing in front, or the attendant standing behind the shearing machine, to move easily the counter blade to the desired raised or lowered position.

The eccentric 33 could also be controlled by the motor 22 driving the spindle 4 of the movable blade 1 and mounted on the carriage 21. In the construction shown in Fig. 17, a claw clutch half 67 sliding on the spindle 4, could be brought into engagement, by means of the hand lever 68, with a second claw clutch half 69 secured to the said spindle 4, so as to couple the latter a toothed wheel gear such as 70 driving the spindle 71.

This spindle 71 which is supported at its ends in the shearing machine frame, drives through a bevel pinion 72 and a vertical spindle 73, a second horizontal spindle 74 also rotating in the frame and driving by means of reducing gears 75, the eccentric 33.

In order to bring about the lowering of the counter blade 3, it is sufficient to bring into engagement the claw clutch halves 67-69; when the eccentric 33 has reached its low dead centre, they are uncoupled for the purpose of introducing the plate between the blades 1 and 3, and then coupled together again by inserting in the set or gear 70 connecting together the spindles 4 and 71, a reversing pinion 76 for the purpose of producing the raising of the counter blade 3, then they are uncoupled again when the eccentric 33 is at its upper dead centre.

This throwing out of gear or uncoupling at the end of travel of the counter blade is preferably produced automatically by any suitable means.

In the construction shown in Fig. 17, the lever 68 which may be held in its two end positions in any desired manner, is brought to the throwing out of gear or disengaging position by a cam 77 which is keyed to the spindle 78 carried by the carriage, and driven by the spindle 71 by means of a worm 79 secured to the said spindle, and of a worm pinion 80 secured to the cam 77, the whole being arranged in such a manner that the said cam makes a complete revolution for each half revolution of the eccentric 33.

In these conditions, the throwing into gear being effected when the eccentric 33 is in its upper dead centre, the cam 77 will return the lever 68 to its throwing out of gear position as soon as the eccentric 33 reaches its low dead centre, that is to say after the disappearance of the counter blade.

A new throwing into gear and the bringing into engagement of the reducing pinion or pinions 76 in the set or gear 70, will produce the raising of the counter blade 3 which will be stopped at the end of its travel by a new action of the cam 77 on the gear lever 68.

This diagrammatic arrangement is of course given merely by way of example, and it is obvious that any mechanical throwing out of gear device could be applied.

In the same way, the said throwing out of gear could be effected electrically, the cam 77, at the upper and lower dead centres of the eccentric 33, closing for instance the excitation circuit of an electromagnet producing the throwing out of gear, the current being taken for instance from the motor 22 without however stopping the latter.

The device controlling the movements of the counter blade 3 by one or the other means hereinbefore set forth, is moreover combined with a device for taking up the play due to the wear of the blades as soon as the said wear takes place.

This device shown in Figures 12 and 13, comprises substantially an eccentric ring 45 which is fitted to the eccentric bearing 33 of the shaft 32 in a seat or recess of the slide block 34, and provided with teeth outside. The teeth of the said ring 45 mesh with a worm 46 also mounted in the slide block 34 and operated by means of a spanner for the purpose of enabling, by a suitable angular rotation given to the ring 45, the counter blade 3 to be raised until it is brought to a suitable position.

Figure 14:
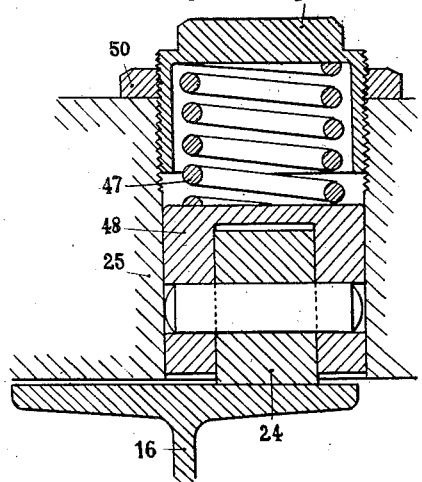
Figures 14 and 15 are detail views.
Figure 15:
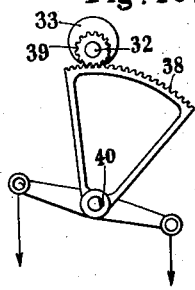

In the construction hereinbefore described, the carriage 25 carrying the counter blade, is mounted, as shown in detail in Fig. 14, on the rollers 24 by means of springs 47 which are interposed between a block 48 movable in the carriage 25 and carrying each roller 24, and a plug 49 screwed into the carriage 25 and locked in any desired position by means of a locknut 50.

Owing to this method of suspension, by suitably screwing the plug 49, the spring 47 can be given sufficient tension to produce, during the unlocking of the carriage 25, the rising of the latter above the girders 16 and thus to enable it to move without friction along the said girders.

In the construction just described, the shearing machine according to the invention, which is more particularly suitable for cutting metal sheets of very large dimensions, makes it possible, owing to the method of regulation of the movement of the adjustable blade, to adapt this movement to any conditions of the work to be executed and to the nature of the body to be cut.

In addition to this important advantage, the method of mounting of the adjustable blade and of the counter blade on carriages which can be moved parallel to each other and the position of which can be adjusted, makes it possible to bring the blade to this or that point of the surface of the sheets to be cut, and thus to cut them at any desired place. Moreover the possibility of causing the counter blade to disappear at any point of the travel of the carriages 21 and 25 makes it possible to introduce between the blades plates of any thickness, to move the said plates freely between the said blades and to expose them to the action of the latter at the desired point, in order to slot or cut them at any points of their surface, without it being necessary, except in the case of very great thickness, to punch or to perforate them first.

Finally, the counter blade being under the body to be cut, the latter is exposed only to slight vibrations, and as on the other hand, it rests on rolling parts 61, balls or others, carried by the brackets 29 and projecting outside the latter, the plate can be easily guided between the blades and cut at any points of its surface in accordance with any desired outlines, even those with sharp angles.

In the simplified construction shown in Figures 18 and 19, the shearing machine comprises, as hereinbefore specified, a blade 1 which has relatively to a counter blade 3 a practically elliptical movement which can be regulated by the means described.

The adjustable blade 1 is mounted in the head of the upper arm of a swan neck frame 51, and the spindle 4 of adjustable eccentricity operating this blade, passes through the said arm and is driven directly by the electric motor 22.

The counter blade 3 is mounted in the head of the lower arm of the frame 51 and secured to a carriage 31 which slides vertically in the said frame and is connected by a collar 52 to the eccentric 33 intended to produce vertical movements of the counter blade and to enable namely the latter to be lowered for the cutting of plates at any point of their surface.

This eccentric 33 is keyed for the purpose to a shaft 32 which is rotatably mounted in a lug 53 of the frame and carries a control lever 54 which can be operated by hand or by a pedal 55 connected to the said lever by a rod 56 and returned to the upper position by a spring 57.

In this raised position of the pedal, the eccentric 33 is at its upper dead centre, and the counter blade 3 is in the normal working position; when on the contrary the pedal is depressed, the eccentric 33 secured to the lever 54 will produce the lowering of this counter blade, and it will thus become possible to place between the blades 1 and 3 punched or non-punched sheets or plates, as already explained.

When the cutting is to be effected starting from any point at the edge of the plates and therefore there is no need to lower the counter blade, the latter can be locked in its upper position by securing together the lever 54 and the collar 52 by means of a pin 58 introduced into corresponding holes 59 of these two parts.

For adjusting the counter blade 3 to its working position and for taking up the wear, the shaft 32 producing the movement of the said counter blade, is supported in the lug 53 of the frame by means of an eccentric ring 60, the orientation of which in the said frame can be modified at will, so as to enable the shaft 32 to be slightly raised or lowered, and therefore the position of the counter blade regulated.

The arrangements described are of course given merely by way of example, and the shapes, materials and dimensions, of the constituent parts as well as the details of construction could be modified without departing from the spirit of the invention.

Claims:—

1. In a shearing machine having fixed and movable blades, adjustable mechanism for oscillating the movable blade, comprising a power-driven rotary eccentric, a blade-holder mounted thereon and containing a slot, a normally fixed pin engaging said slot, and means for adjustably moving said pin towards and away from the eccentric to vary the path of movement of the blade.

2. In a shearing machine having fixed and movable blades, adjustable means for oscillating the movable blade, comprising a blade-holder by which the movable blade is carried, an eccentric on which the blade-holder is mounted, a normally fixed pin slidably engaging the blade-holder, and means for universal adjustment of said pin in the plane of the blade-holder to vary the path of movement of the cutting edge of the blade.

3. In a shearing machine having fixed and movable blades, adjustable means for oscillating the movable blade, comprising a power-driven eccentric, means for adjustably varying the throw of said eccentric, a normally fixed pin having its axis parallel to that of the eccentric and universally adjustable in a plane perpendicular to its axis, and a blade-holder carrying the movable blade mounted on the eccentric and having a slot engaging the pin.

4. In a shearing machine having fixed and movable blades, the combination of a frame having opposed spaced guiding surfaces, a power-driven shaft journalled on the frame, an eccentric on said shaft located within the frame, a flat blade-holder between the guiding surfaces of the frame operatively connected with said eccentric so as to be oscillated thereby, and a pin engaging the blade-holder and adjustably mounted on said frame for movements in the plane of the blade-holder to vary the movement of the cutting edge of the blade.

5. A shearing machine having cooperating shearing blades, means for oscillating one of said blades, a carrier for the other blade slidably mounted for movement towards and away from the oscillatory blade, a turnable shaft mounted in fixed bearings, an eccentric fixed on said shaft and connected with said blade-carrier so that turning of said shaft moves said blade into and out of operative relation with the oscillatory blade.

6. A shearing machine having cooperating normally overlapping blades, means for oscillating one of said blades, a carrier for the other blade mounted for movement towards and away from the oscillatory blade, an eccentric connected with said carrier and adapted to move the carrier to place its blade in operative relation to the oscillatory blade by turning just beyond its dead center, and a stop preventing further turning of said eccentric.

7. A shearing machine having cooperating normally overlapping blades, means for oscillating one of said blades, a carrier for the other blade mounted for movement towards and away from the oscillatory blade, and an eccentric for sliding said carrier so positioned that it is at dead center when the blade on the carrier is in operative relation with the oscillatory blade, thereby locking said blade against outward movement.

8. A shearing machine having cooperating shear blades, means for oscillating one of said blades, means for causing a limited movement of the other blade towards and away from the oscillatory blade to permit the insertion of said material between them, and adjustable means for varying the inner limit of said movement to provide for taking up wear on the blades.

9. A shearing machine having cooperating normally overlapping blades, means for oscillating one of said blades, means for moving the other blade out of operative relation with the oscillatory blade to provide for the insertion of sheet material between them, power-driven means for forcibly returning said blade to operative position to perforate the sheet of material which has been inserted between the blades.

10. A shearing machine having a frame, comprising two parallel rails supported at their ends, two carriages, one mounted on each of said rails for movement longitudinal thereof, an oscillatory shear blade mounted on one of said carriages, a normally fixed shear blade mounted on the other of said carriages, means for locking the carriages on the rails with said blades in cooperative relation to one another, and means for moving the normally fixed blade with respect to its carriage to separate it from and to bring it into operative relation with the oscillatory blade.

11. A shearing machine, comprising the combination with an oscillating shear blade having a straight cutting edge, of a second shear blade having a straight cutting edge, a mounting for the second shear blade maintaining its cutting edge at an acute angle to that of the oscillating blade throughout the oscillating movement thereof, and means for moving the second shear blade in a direction inclined to its cutting edge from a position spaced from the oscillating blade to a position where its advance corner overlaps a corner of the oscillating blade through the oscillating movement thereof.

12. A shearing machine, comprising a frame having opposed upper and lower heads connected by a member remote therefrom and providing for the material to be cut a plurality of supports lying in a common horizontal plane, upper and lower shear blades mounted on said heads respectively and having straight cutting edges inclined to the horizontal in opposite directions, means for oscillating the upper blade so as to cause a part of its cutting edge to cross and recross the horizontal plane of the work supports, means for moving the lower blade independently of the work supports towards and away from the upper blade, and means for locking the lower blade against outward movement when its cutting edge intersects the horizontal plane of the work supports.

13. In a shears, a base, a cutter supporting standard associated therewith, a movable cutter and driving means therefor mounted on said base, a normally stationary cutter holder slidably mounted on said standard, a cutting blade secured to said holder, a manually operable lever movable to two extreme positions and operative connections between said lever and holder to move said holder and cutter toward and from said movable cutter, said connections including as inherent elements means to lock said holder and cutting blade against accidental movement in the operative and inoperative positions respectively of said holder and blade.

14. In a shears, a base, a cutter supporting standard associated therewith, a movable cutter and driving means therefor mounted on said base, a normally stationary cutter holder slidably mounted on said standard, a cutting blade secured to said holder, a manually operable lever movable to two extreme positions, a bearing block secured to said holder, an eccentric rotatably mounted in said block and connections between said eccentric and lever.

15. In a shears, a supporting framework having a standard, a movable blade and actuating mechanism therefor, a normally stationary blade mounted on said standard for vertical and lateral adjustment towards and from said movable blade, and means for moving said stationary blade vertically, comprising an eccentric, manually operable means for rotating said eccentric to move said blade to and from its operative position, and an eccentric bearing in which said eccentric is mounted for adjusting said blade vertically.

The foregoing specification of my "improvements in or relating to machines for shearing metal and other sheets" signed by me this 21st day of September, 1926.

JEAN ACHARD.